United States Patent
Omiya et al.

(10) Patent No.: US 10,875,452 B2
(45) Date of Patent: Dec. 29, 2020

(54) DRIVING ASSISTANCE DEVICE AND DRIVING ASSISTANCE METHOD

(71) Applicant: DENSO CORPORATION, Kariya (JP)

(72) Inventors: Shogo Omiya, Kariya (JP); Akihiro Sunasaka, Kariya (JP); Nobuyuki Yokota, Kariya (JP); Hirohiko Yanagawa, Kariya (JP)

(73) Assignee: DENSO CORPORATION, Kariya (JP)

(*) Notice: Subject to any disclaimer, the term of this patent is extended or adjusted under 35 U.S.C. 154(b) by 132 days.

(21) Appl. No.: 16/069,060

(22) PCT Filed: Jan. 11, 2017

(86) PCT No.: PCT/JP2017/000559
§ 371 (c)(1),
(2) Date: Jul. 10, 2018

(87) PCT Pub. No.: WO2017/122654
PCT Pub. Date: Jul. 20, 2017

(65) Prior Publication Data
US 2019/0009720 A1   Jan. 10, 2019

(30) Foreign Application Priority Data
Jan. 12, 2016 (JP) .................. 2016-003749

(51) Int. Cl.
*H04N 5/265* (2006.01)
*B60R 1/00* (2006.01)
(Continued)

(52) U.S. Cl.
CPC ............ *B60R 1/00* (2013.01); *G08G 1/165* (2013.01); *G08G 1/166* (2013.01); *H04N 5/247* (2013.01);
(Continued)

(58) Field of Classification Search
CPC ............ B60R 1/00; B60R 2300/105; B60R 2300/303; B60R 2300/307;
(Continued)

(56) References Cited

U.S. PATENT DOCUMENTS

| | | | |
|---|---|---|---|
| 7,307,655 B1 | 12/2007 | Okamoto et al. | |
| 2007/0206835 A1* | 9/2007 | Abe | H04N 7/181 382/104 |

(Continued)

FOREIGN PATENT DOCUMENTS

| | | |
|---|---|---|
| JP | 3286306 B2 | 5/2002 |
| JP | 2011-025874 A | 2/2011 |

(Continued)

OTHER PUBLICATIONS

International Search Report in PCT/JP2017/000559 dated Mar. 28, 2017 in 2 pages.

*Primary Examiner* — Lindsay J Uhl
*Assistant Examiner* — Jae N Noh
(74) *Attorney, Agent, or Firm* — Maschoff Brennan

(57) ABSTRACT

A driving assistance device converts an image captured by an in-vehicle camera configured to image the periphery of a vehicle into an image viewed from a virtual viewpoint. The driving assistance device combines, as a higher-level layer, a vehicle image indicating the position and shape of the vehicle with a converted target image. The driving assistance device adjusts the opacity of the vehicle image such that the target image as a lower-level layer is visible at a superimposed portion of the vehicle image and the target image. At this point, the opacity of the vehicle image is variably set according to at least one of an own vehicle surrounding condition or a vehicle running condition. The (Continued)

driving assistance device outputs, as a driving assistance image, the target image combined with the adjusted vehicle image.

5 Claims, 6 Drawing Sheets

(51) Int. Cl.
| | |
|---|---|
| *G08G 1/16* | (2006.01) |
| *H04N 7/18* | (2006.01) |
| *H04N 5/247* | (2006.01) |
| *H04N 5/262* | (2006.01) |
| *H04N 5/445* | (2011.01) |

(52) U.S. Cl.
CPC ........... *H04N 5/265* (2013.01); *H04N 5/2628* (2013.01); *H04N 5/44504* (2013.01); *H04N 7/181* (2013.01); *B60R 2300/105* (2013.01); *B60R 2300/303* (2013.01); *B60R 2300/307* (2013.01); *B60R 2300/60* (2013.01); *B60R 2300/605* (2013.01); *G08G 1/16* (2013.01)

(58) Field of Classification Search
CPC .......... B60R 2300/60; B60R 2300/605; G08G 1/165; G08G 1/166; G08G 1/16; H04N 5/247; H04N 5/2628; H04N 5/265; H04N 5/44504; H04N 7/181
USPC ......................................................... 348/148
See application file for complete search history.

(56) References Cited

U.S. PATENT DOCUMENTS

| | | | |
|---|---|---|---|
| 2011/0025848 A1 | 2/2011 | Yumiba et al. | |
| 2011/0032374 A1 | 2/2011 | Imanishi et al. | |
| 2013/0063601 A1 | 3/2013 | Wakabayashi et al. | |
| 2014/0292805 A1 | 10/2014 | Yamada et al. | |
| 2016/0094808 A1* | 3/2016 | Cerri .......................... | B60R 1/00 |
| | | | 348/36 |
| 2017/0106750 A1* | 4/2017 | Tauchi ..................... | B60R 1/00 |
| 2018/0315167 A1* | 11/2018 | Akiyama ................. | H04N 7/18 |

FOREIGN PATENT DOCUMENTS

| | | |
|---|---|---|
| JP | 5077307 B | 11/2012 |
| JP | 2013-100057 A | 5/2013 |
| JP | 5223811 B2 | 6/2013 |
| JP | 2014-060646 A | 4/2014 |
| JP | 2014-197818 A | 10/2014 |
| WO | WO 2011/158609 A1 | 12/2011 |

* cited by examiner

REAR ← → FRONT

SIDE VIEW IMAGE

REAR VIEW IMAGE

REGION WHERE NO VIEWPOINT CONVERTED IMAGE IS PRESENT

OPACITY: LOW

CHILDREN

VEHICLE IMAGE

OPACITY: HIGH

VEHICLE IMAGE

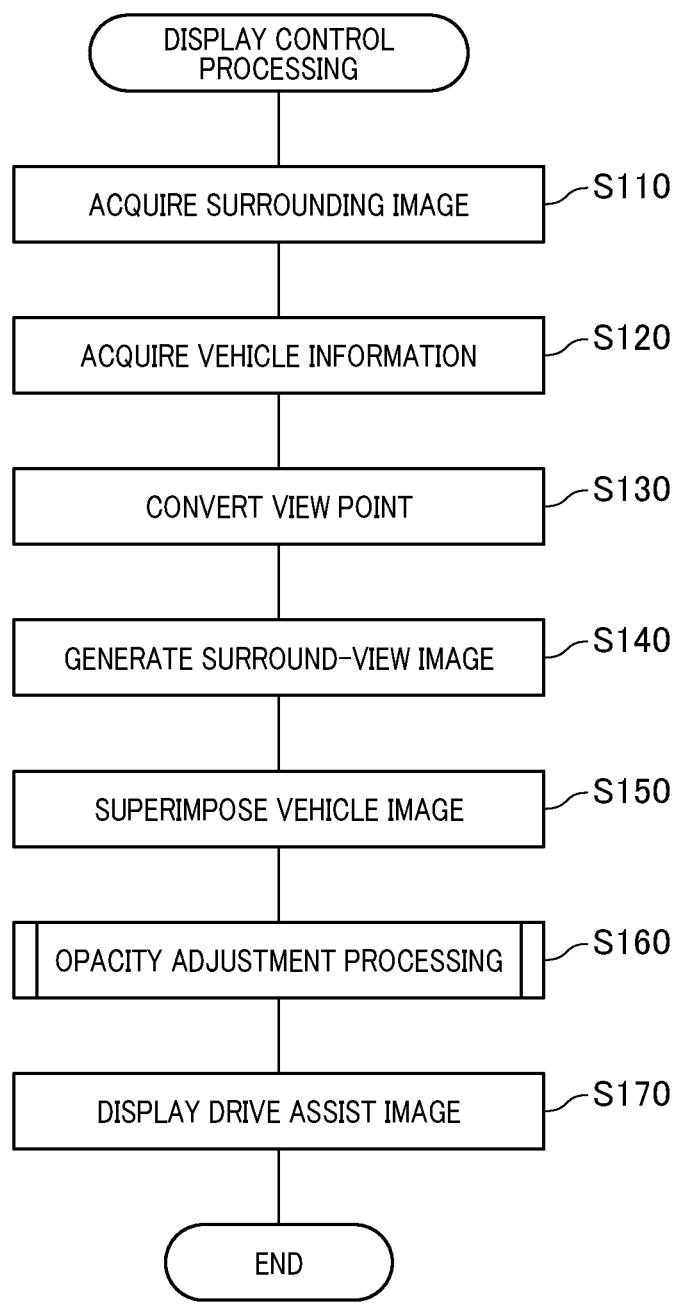

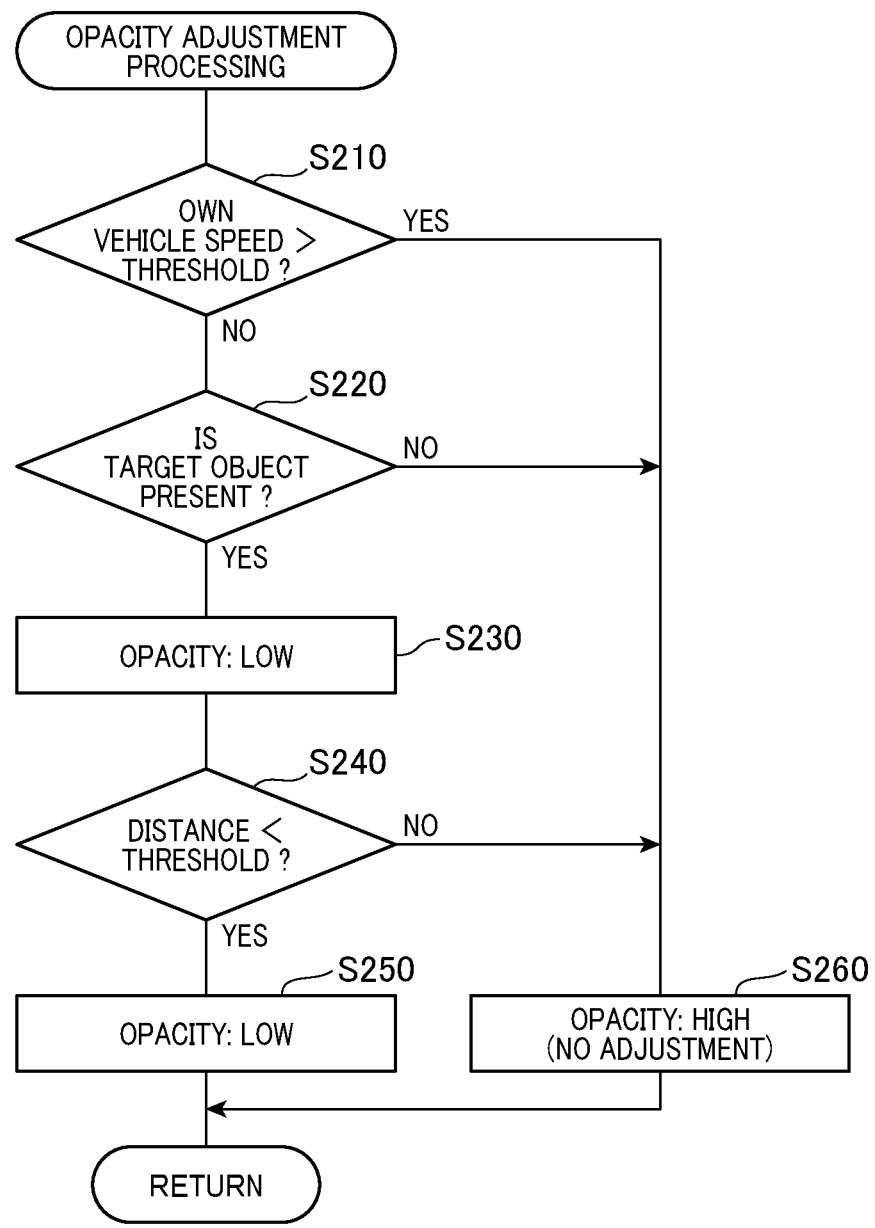

DRIVING ASSISTANCE DEVICE AND DRIVING ASSISTANCE METHOD

CROSS-REFERENCE TO RELATED APPLICATION

This application is based on and claims the benefit of priority from earlier Japanese Patent Application No. 2016-003749 filed on Jan. 12, 2016, the disclosure of which is incorporated herein by reference.

TECHNICAL FIELD

The present disclosure relates to a display control technique for providing a driving assistance image to a driver.

BACKGROUND ART

A technique has been known as display control, the technique being the technique of imaging the periphery of a vehicle by multiple in-vehicle cameras to convert each captured image into an image viewed from a virtual viewpoint, thereby displaying a combined image, which is obtained by joining of part of each converted image, as a driving assistance image on a display.

PTL 1 discloses the technique of, for example, superimposing a vehicle image on a combined image, when a driving assistance image is generated on the basis of a virtual viewpoint such as when someone see the periphery of a vehicle including the front of the vehicle and the rear of the vehicle, the vehicle image indicating the position and shape of the vehicle as if the periphery of the vehicle is viewed from the virtual viewpoint.

CITATION LIST

Patent Literature

[PTL 1] JP 5077307 B

SUMMARY OF THE INVENTION

Technical Problem

However, in the above-described technique, the vehicle image is superimposed on the combined image in the driving assistance image, and therefore, important elements (important information on driving assistance) supposed to be displayed on the combined image at a superimposed portion is, in some cases, not displayed due to the vehicle image.

The present disclosure is intended to provide a technique of properly displaying a driving assistance image for a driver.

Solution to Problem

A driving assistance device as one aspect of the present disclosure includes a converter (22), a combining section (23), an adjuster (25), and an output section (26). The converter is configured to convert an image captured by an in-vehicle imaging device configured to image the periphery of a vehicle into an image viewed from a preset virtual viewpoint.

The combining section is configured to combine, as a higher-level layer, an image (hereinafter referred to as a "vehicle image") indicating the position and shape of the vehicle for the image (hereinafter referred to as a "target image") converted from the captured image by the converter. The adjuster is configured to adjust the opacity of the vehicle image such that the target image as a lower-level layer is visible at a superimposed portion where the target image is superimposed the vehicle image combined using the combining section.

At this point, the adjuster variably sets the opacity of the vehicle image according to at least one of a vehicle surrounding condition or a vehicle running condition. After such adjustment, the output section is configured to output, as a driving assistance image, the target image combined with the vehicle image using the combining section.

With the above-described configuration, the driving assistance device of the present disclosure variably sets the opacity of the vehicle image according to at least one of the vehicle surrounding condition or the vehicle running condition. Thus, in the driving assistance device, the vehicle image is, with the opacity varying according to situation, superimposed and displayed at the portion superimposed on the target image. Moreover, according to circumstances, the opacity may be set to zero so that the vehicle image can be brought into a hidden state (non-display state) at the portion superimposed on the target image. As described above, the driving assistance device variably controls the form of displaying the vehicle image. With this configuration, the driving assistance image can be properly displayed for a driver in the driving assistance device (the driving assistance image more useful to the driver can be displayed).

Moreover, in a driving assistance method as one aspect of the technique of the present disclosure, advantageous effects similar to those of the driving assistance device are provided due to reasons similar to those described above.

Note that each reference numeral in parenthesis as described in this section and the claims indicates a correspondence with specific means described in an embodiment described later. Thus, the reference numerals are not intended to limit the technical scope of the present disclosure.

BRIEF DESCRIPTION OF THE DRAWINGS

FIG. 9 is a flowchart of display control processing.

FIG. 10 is a flowchart of opacity adjustment processing.

DESCRIPTION OF EMBODIMENTS

Hereinafter, the mode for carrying out a driving assistance device and a driving assistance method according to one aspect of a technique of the present disclosure will be described with reference to the drawings.

1. First Embodiment

1-1. Entire Configuration

Figure 1:
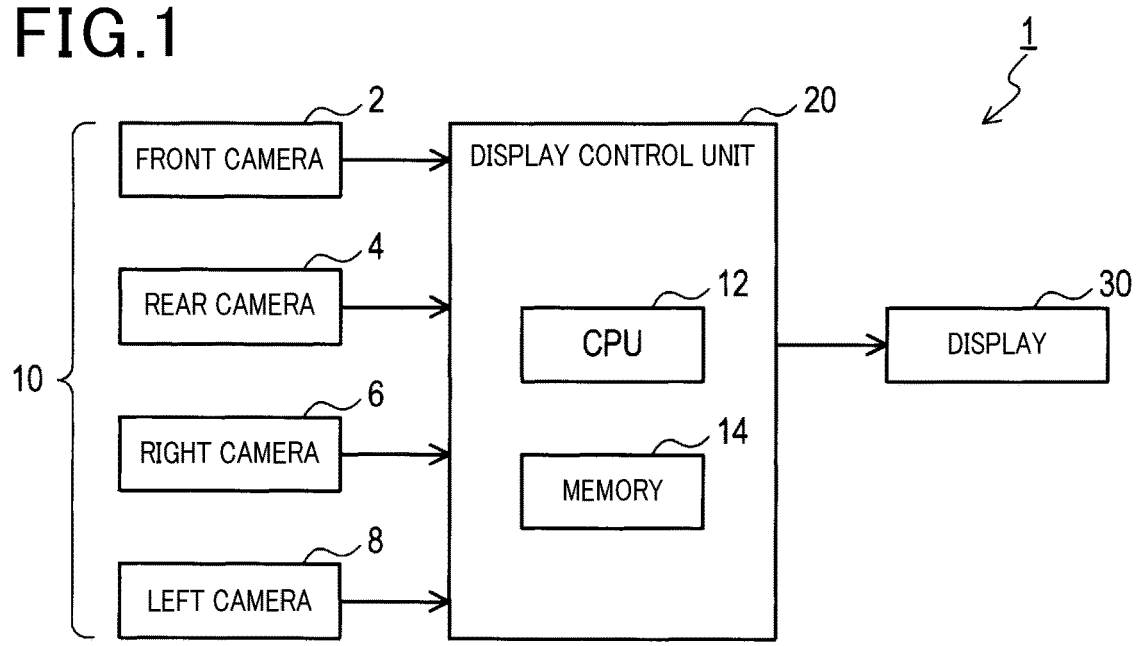
FIG. 1 is a block diagram of a configuration of a driving assistance device.

As illustrated in FIG. 1, a driving assistance device 1 according to the present embodiment includes in-vehicle cameras 10, a display control unit 20, and a display 30. Although not shown in the figure, the driving assistance device 1 is connected to an in-vehicle LAN. The driving assistance device 1 is configured to share, with other electronic control units (hereinafter referred to as "ECUs") connected to the in-vehicle LAN, vehicle information such as detection information of various sensors and control information in the ECU. In description below, a vehicle equipped with these components will be described as an "own vehicle."

The in-vehicle LAN is a local area network equipped in the own vehicle, and is configured to transfer various types of information by means of a well-known communication protocol such as CAN, FlexRay, LIN, MOST, and AVC-LAN. In the driving assistance device 1, the display control unit 20 connected to the in-vehicle LAN is configured to acquire, as the vehicle information, a shift lever position, a vehicle speed, an acceleration, a steering angle, a yaw rate, an illuminance, target information, etc. from the other ECUs.

The illuminance is information indicating brightness around the own vehicle. The illuminance is information transferred from the other ECUs with an automatic lighting function. The automatic lighting function is for performing the control of automatically turning on headlights when it grows dark. Such information may be a detection result from a well-known illuminance sensor, or may be an estimation result based on an image captured by the in-vehicle camera 10. Alternatively, the information may be a combination of these results.

The target information is information indicating a distance between a target object around the vehicle and the own vehicle, the speed of the target object relative to the own vehicle, etc. The target information regarding the target object in the front of the vehicle is information transferred from the other ECUs with, e.g., a collision damage reduction brake or adaptive cruise control function. The collision damage reduction brake function is for controlling a brake (braking control) to avoid collision between the target and the own vehicle or to reduce collision damage in a case where the risk of collision with the detected target is sensed. The adaptive cruise control function is for automatically controlling constant speed running while an inter-vehicular distance is held constant. Such information may be a detection result from a well-known in-vehicle radar such as a millimeter wave radar, or may be a measurement result based on the image captured by the in-vehicle camera 10. Alternatively, the information may be a combination of these results.

Moreover, the target information regarding the target object at the periphery of the vehicle including rear and lateral sides of the vehicle is information transferred from the other ECUs with a parking assist function. The parking assist function is for automatically controlling steering operation etc. to park the own vehicle in a parking space to avoid contact with, e.g., a surrounding parked vehicle or obstacle. Such information may be a detection result from an in-vehicle sonar such as an ultrasonic sensor, or may be a measurement result based on the image captured by the in-vehicle camera 10. Alternatively, the information may be a combination of these results.

The in-vehicle camera 10 is an in-vehicle imaging device mounted on the own vehicle to image the periphery of the vehicle. In the present embodiment, the in-vehicle camera 10 is placed at each of front, rear, right, and left positions of the own vehicle. The image captured by the in-vehicle camera 10 is output not only to the display control unit 20, but also to the other ECUs. This is because the other ECUs utilize the captured image for recognizing other vehicles, pedestrians, obstacles, etc. set in advance as the target objects around the own vehicle or traffic lanes, parking spaces, etc.

The in-vehicle cameras 10 according to the present embodiment are, according to the installation position and imaging region of each camera at the own vehicle, roughly classified into a front camera 2, a rear camera 4, a right camera 6, and a left camera 8.

Figure 2:
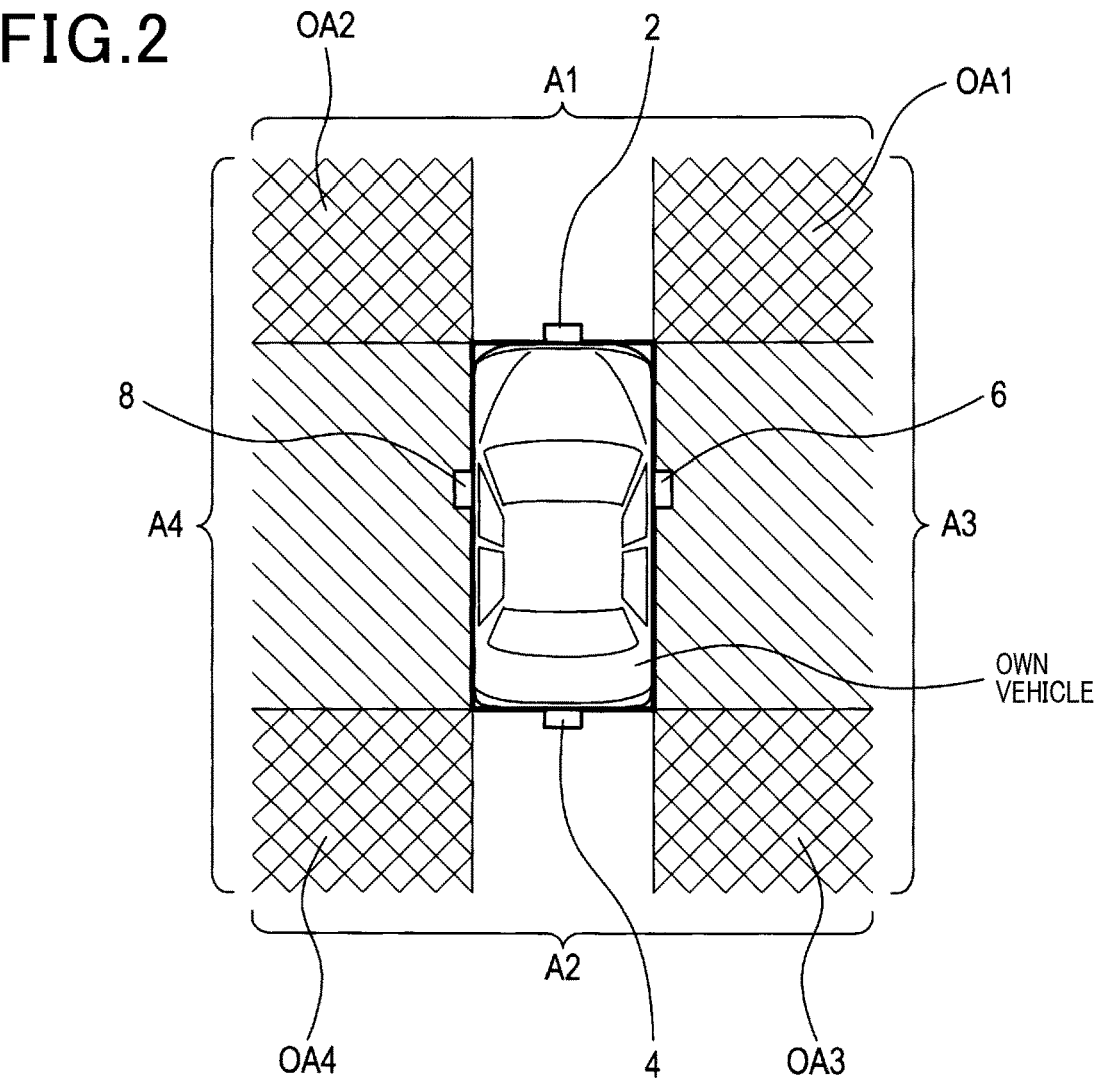
FIG. 2 is a view for describing an example of each imaging region of an in-vehicle camera.

As illustrated in FIG. 2, the front camera 2 is mounted on a front portion (e.g., a front center portion) of the own vehicle, thereby imaging a front region A1 of the own vehicle. The rear camera 4 is mounted on a rear portion (e.g., a rear center portion) of the own vehicle, thereby imaging a rear region A2 of the own vehicle. The right camera 6 is mounted on a right portion (e.g., a right rear mirror portion) of the own vehicle, thereby imaging a right region A3 of the own vehicle. The left camera 8 is mounted on a left portion (e.g., a left rear mirror portion) of the own vehicle, thereby imaging a left region A4 of the own vehicle.

The in-vehicle cameras 10 are placed at the own vehicle such that part of an imaging region of one of the in-vehicle cameras 10 overlaps with part of an imaging region of at least another one of the in-vehicle cameras 10. That is, the front camera 2, the rear camera 4, the right camera 6, and the left camera 8 are, in shooting regions thereof, set to have regions (hereinafter referred to as "overlapping regions") overlapping with each other. For example, as illustrated in FIG. 2, the front region A1 as the imaging region of the front camera 2 has a front right overlapping region OA1 partially overlapping with the right region A3 as the imaging region of the right camera 6. Moreover, the front region A1 has a front left overlapping region OA2 partially overlapping with the left region A4 as the imaging region of the left camera 8. The rear region A2 as the imaging region of the rear camera 4 has a rear right overlapping region OA3 partially overlapping with the right region A3 as the imaging region of the right camera 6. Moreover, the rear region A2 has a rear left overlapping region OA4 partially overlapping with the left region A4 as the imaging region of the left camera 8.

As described above, in the present embodiment, the in-vehicle cameras 10 are equipped such that each imaging region has overlapping regions. With this configuration, the entire periphery of the own vehicle can be more reliably imaged in the driving assistance device 1 according to the present embodiment. Note that as indicated by a region surrounded using a thick line in FIG. 2, a region (hereinafter referred to as a "main body region") of a main body portion of the own vehicle cannot be imaged from any of the in-vehicle cameras 10 in the present embodiment.

The display 30 is in, e.g., a vehicle interior, placed as a display device mounted on the own vehicle. The display 30 includes a liquid crystal display, a head-up display, or a combination thereof, and is placed at a position easily viewable by a driver of the own vehicle.

1-2. Configuration of Display Control Unit 20

The display control unit 20 includes a well-known microcomputer with a CPU 12 and a memory 14, and the ECUs including a communication controller of the in-vehicle LAN etc. The memory 14 is a storage medium represented by a semiconductor memory such as RAM, ROM, and a flash memory and having a predetermined storage area. The CPU 12 is a calculation device configured to perform, according to a predetermined processing procedure (based on a program), predetermined calculation for data input from an input device or a storage device, thereby outputting the resultant data to an output device or a storage device. Thus, in the display control unit 20, various types of processing are executed by the CPU 12 based on the program stored in the memory 14. That is, in the display control unit 20, a display control method corresponding to the program (the predefined processing procedure) is executed. Note that the number of microcomputers may be one or more, and each installation location of the one or more microcomputers may be any location in the vehicle.

Figure 3:
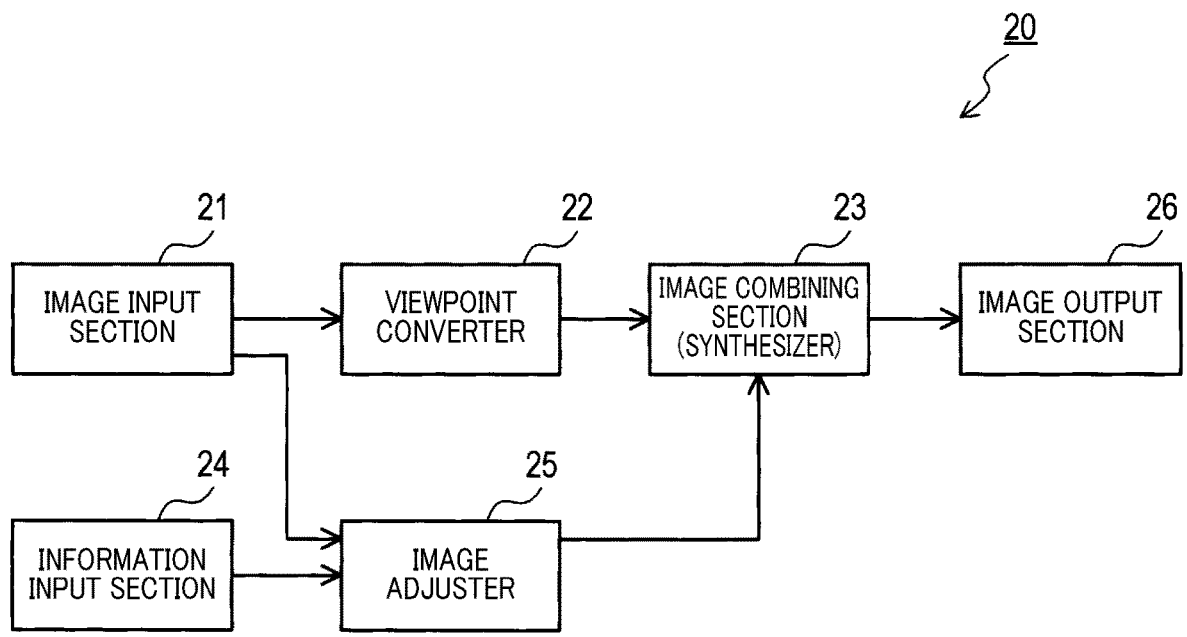
FIG. 3 is a block diagram of a functional configuration of a display control unit.

The display control unit 20 implements the following functions by execution of various types of processing by means of the CPU 12. Specifically, the functions of the display control unit 20 will be described with reference to FIG. 3. As illustrated in FIG. 3, the display control unit 20 has an image input section 21, a viewpoint converter 22, an image combining section (synthesizer) 23, an information input section 24, an image adjuster 25, and an image output section 26. Note that these functions of the display control unit 20 are not limited to a configuration implemented as software by execution of programs. Other implementation methods may include a configuration in which some or all of the functions are implemented as hardware by one or more electronic circuits such as logic circuits and ICs. That is, the above-described functions of the display control unit 20 can be implemented and provided not only by the software but also by the hardware or a combination thereof.

The image input section 21 is configured to acquire the images (hereinafter referred to as "surrounding images") showing the periphery of the own vehicle from the in-vehicle cameras 10. In the present embodiment, the image input section 21 acquires, at a predetermined frame rate, each surrounding image captured by imaging of the front region A1, the rear region A2, the right region A3, and the left region A4 from the in-vehicle cameras 10 (the front camera 2, the rear camera 4, the right camera 6, and the left camera 8). The image input section 21 stores, in the memory 14, these surrounding images in an identifiable form. Note that in the memory 14, well-known camera parameters including external parameters indicating the position and posture of each in-vehicle camera 10 and internal parameters including a focal length, an image center position, an image size, a distortion aberration coefficient, etc. are stored. The image input section 21 may acquire some or all of these camera parameters from each in-vehicle camera 10. The camera parameters are used when a viewpoint converted image or a target image described below is generated.

The viewpoint converter 22 is configured to convert each surrounding image acquired by the image input section 21 into an image (hereinafter referred to as the "viewpoint converted image") viewed from a preset virtual viewpoint. The viewpoint converted image is an image obtained in such a manner that the surrounding image viewed from the point of view of the in-vehicle camera 10 is coordinate-converted as if the image is viewed from the point of view of a virtual camera (a virtual viewpoint). For example, with reference to an optical axis of a camera coordinate system, the viewpoint converter 22 first obtains a coordinate position at any point on the captured image based on an angle and a distance from the optical axis. The viewpoint converter 22 rotates and translates these coordinate positions based on the optical axis of the virtual camera. As described above, the viewpoint converter 22 converts the point of view of the image. In the driving assistance device 1 according to the present embodiment, when the position and orientation of the virtual viewpoint are set as the optical axis of the virtual camera, a desired viewpoint converted image is captured. Note that the technique regarding image viewpoint conversion is well known, and therefore, detailed description thereof will not be made.

The viewpoint converter 22 may output, as the target image, the viewpoint converted image based on one of the multiple surrounding images to the image combining section 23. Alternatively, the viewpoint converter 22 converts each of the multiple surrounding images into the image viewed from the virtual viewpoint. Then, the viewpoint converter 22 may output, as the target image, an image (hereinafter referred to as an "surround-view image") obtained by joining of part of the viewpoint converted images to the image combining section 23. Specifically, on the surround-view image, image regions corresponding to the overlapping regions such as the front right overlapping region OA1, the front left overlapping region OA2, the rear right overlapping region OA3, and the rear left overlapping region OA4 are joined as part of the viewpoint converted images. Note that the technique regarding image joining is well known, and therefore, detailed description thereof will not be made.

Examples of the form of the surround-view image include a front view image, a rear view (back view) image, a side view image, and a bird's-eye view image. In the present embodiment, an image corresponding to driving operation or switch operation by a user is selected from these images.

Figure 4:
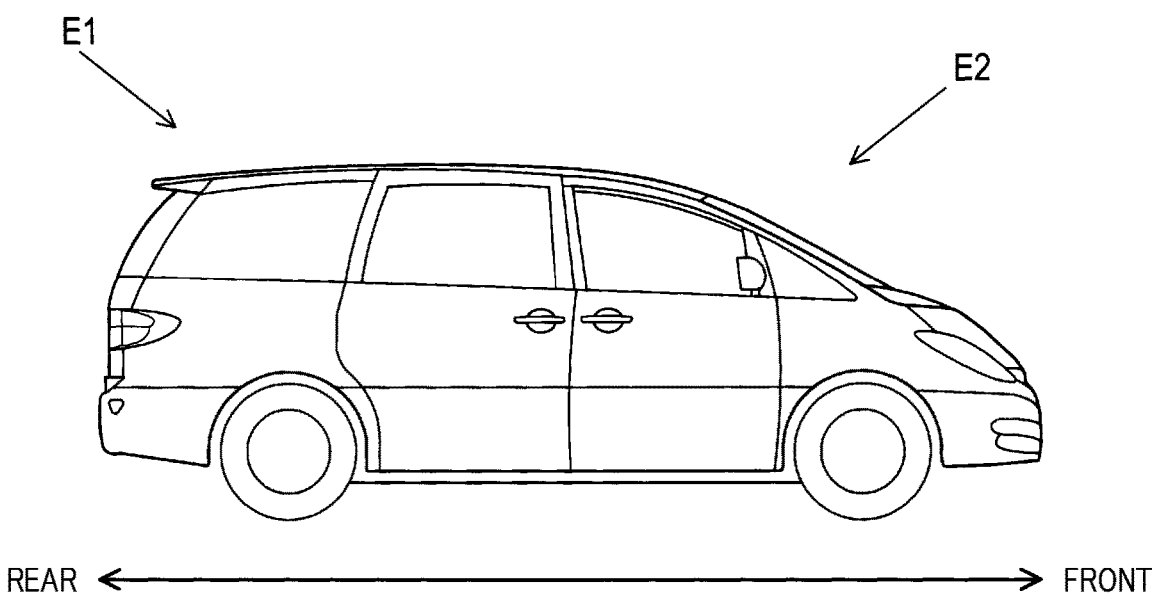
FIG. 4 is a view for describing an example of a virtual viewpoint in a longitudinal direction of an own vehicle.
Figure 5:
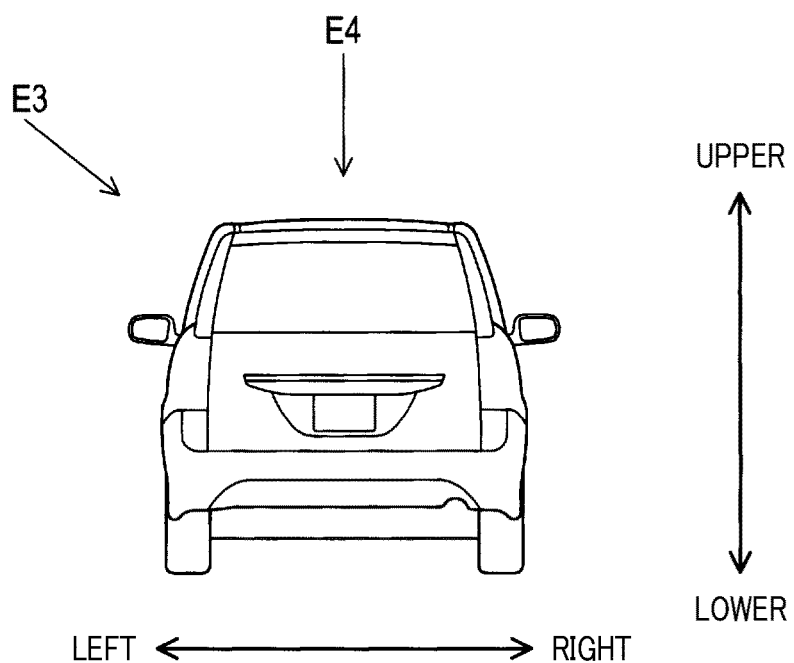
FIG. 5 is a view for describing an example of a virtual viewpoint in a lateral direction and a vertical direction of the own vehicle.

For example, in the case of setting a virtual viewpoint E1 illustrated in FIG. 4, the viewpoint converter 22 generates, as the target image, the rear view image viewed, including the own vehicle, diagonally forward and downward at a predetermined angle from a diagonally-upward rear position of the own vehicle. On the other hand, in the case of setting a virtual viewpoint E2, the viewpoint converter 22 generates, as the target image, the front view image viewed, including the own vehicle, diagonally rearward and downward at a predetermined angle from a diagonally-upward front position of the own vehicle. Moreover, in the case of setting a virtual viewpoint E3 illustrated in FIG. 5, the viewpoint converter 22 generates, as the target image, the side view image viewed, including the own vehicle, diagonally rightward and downward at a predetermined angle from a diagonally-upward left position of the own vehicle, for example. Further, in the case of setting a virtual viewpoint E4 illustrated in FIG. 5, the viewpoint converter 22 generates, as the target image, the bird's-eye view image viewed, including the own vehicle, downward from a position above the own vehicle, for example. Note that in description below, in the case of collectively referring the virtual viewpoints E1, E2, E3, E4, these viewpoints will be referred to as "virtual viewpoints E" for the sake of convenience.

The image combining section 23 is configured to combine, as a higher-level layer, a vehicle image indicating the position and shape of the own vehicle with the target image converted by the viewpoint converter 22. For example, in a case where the target image is the surround-view image, a region corresponding to the main body region which cannot be imaged from any of the in-vehicle cameras 10 is present on the target image. In the present embodiment, the image combining section 23 combines, as a virtual material image according to the position and orientation of the virtual viewpoint E, the vehicle image with such a region (the region where no viewpoint converted image is present).

Figure 6:
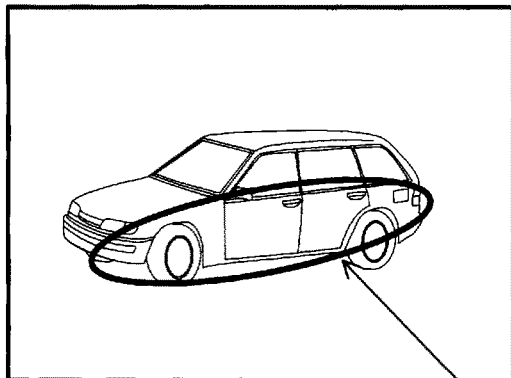
FIG. 6 is a view for describing an example of a region (a non-image region) where no viewpoint converted image is present on a target image.
Figure 6:
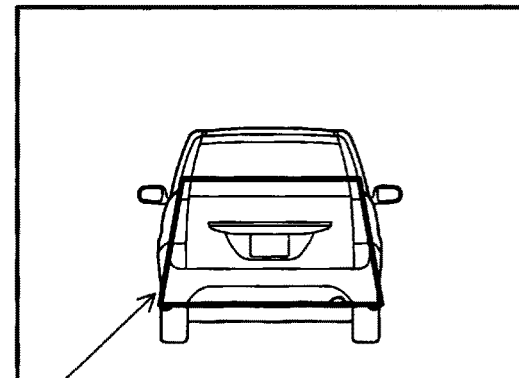

The vehicle images are images indicating multiple vehicle shape patterns according to the position and orientation of the virtual viewpoint E. The vehicle image is stored in advance in the memory 14. The image combining section 23 superimposes the vehicle image such that exposure of the region where no viewpoint converted image is present, such as regions surrounded by thick lines of FIG. 6, is avoided as much as possible on the surround-view image such as the side view image or the rear view image. In the case of the target image including an image region where the viewpoint converted image is present and a non-image region where no view-point-converted image is present, the image combining section 23 combines, as the higher-level layer, the vehicle image with the target image, the vehicle image being set to such position and size that a large portion of the non-image region is covered.

The information input section 24 is configured to acquire, in a predetermined cycle, the vehicle information such as the shift lever position, the vehicle speed, the acceleration, the steering angle, the yaw rate, the illuminance, and the target information from the other ECUs via the in-vehicle LAN. The information input section 24 is configured to store the acquired vehicle information in the memory 14 with the vehicle information being associated with the timing at which the surrounding image is acquired by the image input section 21.

The image adjuster 25 is configured to adjust the opacity of the vehicle image such that the target image as a lower-level layer is visible at a superimposed portion where the target image is superimposed the vehicle image combined using the combined section 23. At this point, the image adjuster 25 variably sets the opacity of the vehicle image according to at least one of a vehicle surrounding condition or a vehicle running condition.

In the present embodiment, the opacity is information obtained in such a manner that the degree of visibility (how much the target image is visible) of the target image as the lower-level layer at the portion superimposed on the target image is quantified. That is, the opacity is information obtained in such a manner that the degree transparency of the target image as the lower-level layer at the portion superimposed on the target image is quantified. The opacity means that a greater opacity value (a higher opacity) results in a higher color density of the vehicle image as the higher-level layer. Thus, in the case of a high opacity, the target image is less visible. On the other hand, the opacity means that a smaller opacity value (a lower opacity) results in a lower color density of the vehicle image as the higher-level layer. Thus, in the case of a low opacity, the target image is more visible. Note that in the case of setting the opacity to zero, the color of the vehicle image is transparent. As a result, no vehicle image is displayed at all at the superimposed portion. On the other hand, in the case of setting the opacity to the maximum value (the case of not adjusting the opacity), the color of the vehicle image is non-transparent. As a result, no target image is displayed at all at the superimposed portion. Note that the technique regarding see-through displaying of the superimposed image is well known, and therefore, detailed description thereof will not be made.

The image adjuster 25 may uniformly set an adjustment value of the opacity of the vehicle image across the entire region of the portion superimposed on the target image. Alternatively, the image adjuster 25 may set the portion superimposed on the target image such that the image region where the viewpoint converted image is present and the non-image region where no view-point-converted image is present are different from each other in the adjustment value of the opacity of the vehicle image. In the present embodiment, the image adjuster 25 separately sets the adjustment value of the opacity for the portion of the vehicle image superimposed on the image region and the adjustment value of the opacity for the portion of the vehicle image superimposed on the non-image region. For example, the image adjuster 25 adjusts the opacity for the portion of the vehicle image superimposed on the image region, but does not adjust the opacity for the portion of the vehicle image superimposed on the non-image region. As described above, the image adjuster 25 can set the adjustment value of the opacity for each image region.

The vehicle surrounding condition is information which can be estimated based on, e.g., the illuminance or the target information among the vehicle information acquired by the information input section 24. In the case of a bright situation around the own vehicle, such as daytime, the brightness of the target image is sufficient. Thus, in this case, even when the opacity of the vehicle image is set to a relatively high value, the target image is visibly displayed at the portion superimposed on the vehicle image. On the other hand, in the case of a dark situation around the own vehicle, such as nighttime, the brightness of the target image is insufficient. Thus, in this case, the image adjuster 25 sets the opacity of the vehicle image to a relatively low value. With this configuration, the driving assistance device 1 according to the present embodiment allows the driver to easily view the target image at the portion superimposed on the vehicle image.

Figure 7:
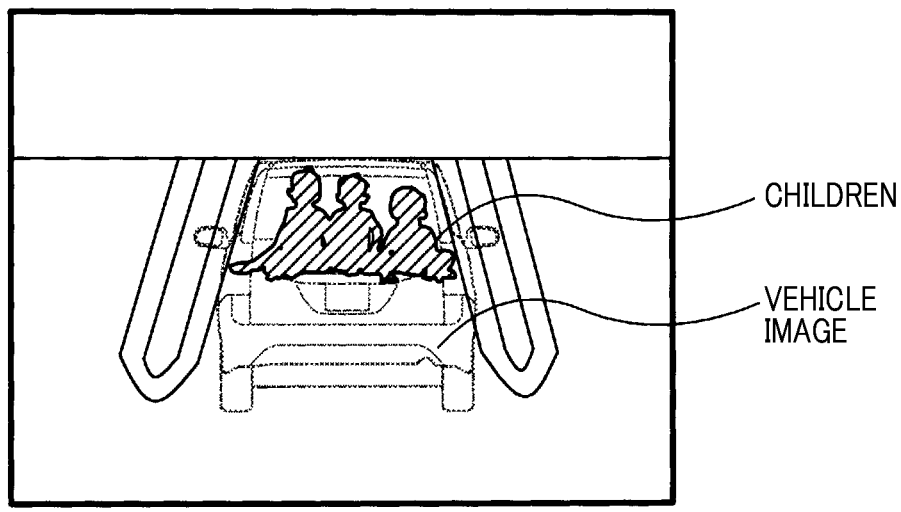
FIG. 7 is a view for describing an example of a driving assistance image in a case where the opacity of a vehicle image is set low.

In a case where the target object such as other vehicles, pedestrians, or obstacles is present around the vehicle, there is a probability that the target object is present on the target image at the portion superimposed on the vehicle image. For this reason, in this case, the image adjuster 25 sets the opacity of the vehicle image to a relatively low value. With this configuration, the driving assistance device 1 according to the present embodiment allows the driver to easily recognize the target object. For example, in a case where children are present on the rear side of the own vehicle parked at a parking area as illustrated in FIG. 7, the image adjuster 25 sets the opacity of the vehicle image to a low value, and in this manner, the vehicle image becomes transparent at the portion superimposed on the target image (child images). With this configuration, the driving assistance device 1 allows the driver to easily recognize the presence of the children on the rear view image. On the other hand, in a case where a target object such as other vehicles, pedestrians, or obstacles is not present around the vehicle, the image adjuster 25 sets the opacity of the vehicle image to a high value, and in this manner, the vehicle image is displayed at the portion superimposed on the target image. With this configuration, the driving assistance device 1 allows the driver to easily recognize the own vehicle on the surround-view image.

Figure 8:
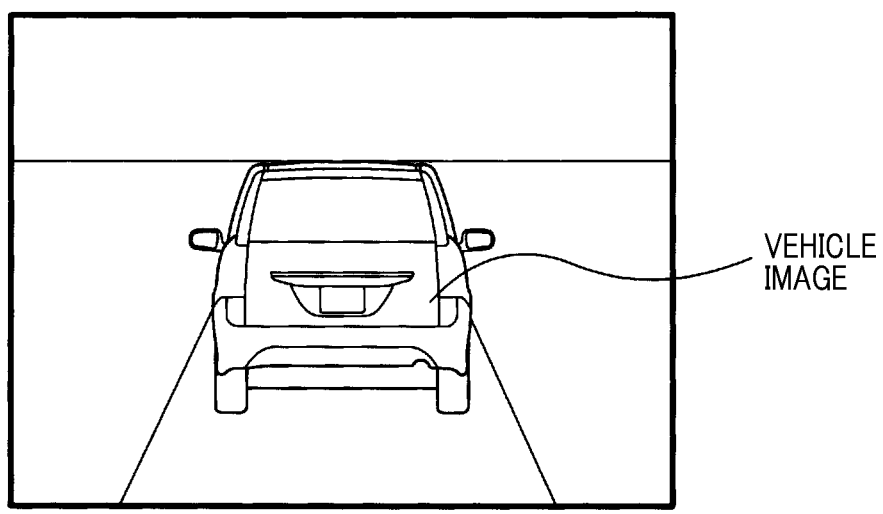
FIG. 8 is a view for describing an example of the driving assistance image in a case where the opacity of the vehicle image is set high.

The vehicle running condition is information based on, e.g., the shift lever position, the vehicle speed, the acceleration, the steering angle, and the yaw rate among the vehicle information acquired by the information input section 24. For example, a driver's drive load condition or the probability of the driver viewing the surround-view image is assumed from the vehicle running condition. In the case of a great value of the vehicle speed, the acceleration, the steering angle, or the yaw rate, it is assumed that the drive load on the driver is high. Thus, in this case, the image adjuster 25 sets the opacity of the vehicle image to a relatively high value as illustrated in FIG. 8. With this configuration, the driving assistance device 1 according to the present embodiment allows the driver to easily view the vehicle image at the portion superimposed on the target image. As a result, the driver can focus on the drive operation. On the other hand, in the case of a small value of the vehicle speed, the acceleration, the steering angle, or the yaw rate, it is assumed that the drive load on the driver is low. Thus, in this case, the image adjuster 25 sets the opacity of the vehicle image to a relatively low value. With this configuration, the driving assistance device 1 allows the driver to easily recognize the target image at the portion superimposed on the vehicle image. As a result, the driver can recognize the target object etc. Moreover, in a case where the shift lever position is a reverse position, a high probability of viewing the rear view image is assumed. Thus, in this case, the image adjuster 25 sets the opacity of the vehicle image to a relatively low value. With this configuration, the driving assistance device 1 allows the driver to easily recognize the target image at the portion superimposed on the vehicle image. As a result, the driver can recognize the target object etc.

The image output section 26 is configured to output, as a driving assistance image, the target image combined with the vehicle image using the image combining section 23. In a case where the opacity is adjusted by the image adjuster 25, the image output section 26 displays, as the driving assistance image, the target image on the display 30, the vehicle image after adjustment being superimposed on the target image. On the other hand in a case where the opacity of the vehicle image is not adjusted by the image adjuster 25, the image output section 26 displays, as the driving assistance image, the target image on the display 30, the target image being generated by the viewpoint converter 22.

As described above, the driving assistance image is an image based on the target image generated by the viewpoint converter 22. More specifically, examples of the driving assistance image include the surround-view image itself, an image obtained by superimposition of the vehicle image on the surround-view image, and an image further subjected to adjustment of the opacity of the vehicle image.

Note that the above-described viewpoint converter 22 is equivalent to a converter and a conversion step for converting the image captured by the in-vehicle imaging device configured to image the periphery of the vehicle into the image viewed from the preset virtual viewpoint E. The above-described image combining section 23 is equivalent to a combining section (synthesizer) and a combining step (synthesizing step) for using, as the target image, the image subjected to captured image conversion by the converter and combining, as the higher-level layer, the vehicle image indicating the position and shape of the vehicle combined with the target image. The above-described image adjuster 25 adjusts the opacity of the image such that the target image as the lower-level layer is visible at the portion of the vehicle image superimposed on the target image, the vehicle image being combined with the target image using the combining section. At this point, the image adjuster 25 is equivalent to an adjuster and an adjustment step for variably setting the opacity of the vehicle image according to at least one of the vehicle surrounding condition or the vehicle running condition. The above-described image output section 26 is equivalent to an output section and an output step for outputting, as the driving assistance image, the target image combined with the vehicle image using the combining section.

1-3. Processing 1-3-1. Display Control Processing

Next, an example of processing (hereinafter referred to as "display control processing") executed by the CPU 12 of the display control unit 20 according to the present embodiment will be described with reference to a flowchart of FIG. 9. Note that the present processing is repeatedly executed in a predetermined cycle (in every cycle) while a switch for a driving assistance function is an ON state with an ignition switch of the own vehicle being in an ON state, for example.

When the present processing is started by the CPU 12 in the display control unit 20, the following display control processing is executed by each of the above-described functions. The image input section 21 acquires the surrounding image from each in-vehicle camera 10 (step S110). The image input section 21 stores the acquired surrounding images in the memory 14. Next, the information input section 24 acquires the vehicle information from the other ECUs via the in-vehicle LAN (step S120). The information input section 24 stores the acquired vehicle information in the memory 14 with the vehicle information being associated with the timing at which the surrounding images are acquired by the image input section 21.

The viewpoint converter 22 converts each surrounding image acquired by the image input section 21 into the viewpoint converted image viewed from the virtual viewpoint E according to the driving operation or the switch operation by the user (step S130). The viewpoint converter 22 joins the viewpoint converted images converted by the processing of the step S130, thereby generating the surround-view image (step S140). The viewpoint converter 22 joins the image regions (part of the viewpoint converted images) corresponding to the overlapping regions of the view-point-converted images, thereby generating the surround-view image. Thus, the surround-view image includes, as described above, the image region where the viewpoint converted image is present, and the non-image region where no view-point-converted image is present.

The image combining section 23 superimposes the vehicle image on the image center region, which includes at least the non-image region, of the surround-view image generated by the viewpoint converter 22 (step S150). The image combining section 23 superimposes the vehicle image corresponding to the virtual viewpoint E of the conversion processing (the processing of the step S130) of the viewpoint converter 22 on the surround-view image. That is, the image combining section 23 combines the vehicle image with the surround-view image such that the vehicle image is the higher-level layer and the surround-view image is the lower-level layer. Thus, at the overlapping portion (the image center region) of the vehicle image and the surround-view image, the combined image includes, as described above, the image region and the non-image region at the lower-level layer (the surround-view image).

The image adjuster 25 adjusts the opacity of the vehicle image combined with the surround-view image using the image combining section 23 (step S160). The image adjuster 25 adjusts the opacity for the portion of the vehicle image overlapping with the image region of the surround-view image, but does not adjust the opacity for the portion of the vehicle image overlapping with the non-image region of the surround-view image. As described above, the image adjuster 25 can set the adjustment value of the opacity for each image region. Note that the processing (hereinafter referred to as "opacity adjustment processing") of adjusting the opacity of the vehicle image will be described later.

At least part of a history image as a viewpoint converted image based on a surrounding image previously captured by the in-vehicle camera 10 is embedded in the non-image region of the surround-view image. In this case, the opacity adjustment processing may be, for example, performed for adjusting not only the opacity for the portion overlapping with the non-image region of the surround-view image but also the opacity for the entirety of the vehicle image. Note that the history image is used in combination with, e.g., the speed/acceleration/steering angle/yaw rate of the own vehicle, and is stored in the memory 14 with the history image being associated with a result (an estimation result by a self-location estimation method) of well-known dead reckoning for estimating the position of the own vehicle relative to each pixel of the viewpoint converted image. With this configuration, the history image can be, as described above, embedded in the non-image region of the surround-view image.

The image output section 26 displays the image as the driving assistance image on the display 30, the image being obtained in such a manner that the vehicle image subjected to opacity adjustment by the image adjuster 25 is combined with the surround-view image (the target image) using the image combining section 23 (step S170). Thereafter, the present processing ends in the display control unit 20.

[1-3-2. Opacity Adjustment Processing]

Next, an example of the opacity adjustment processing executed by the image adjuster 25 at the step S160 will be described with reference to a flowchart of FIG. 10.

The image adjuster 25 determines whether or not the speed (hereinafter referred to as an "own vehicle speed") of the own vehicle exceeds a threshold (step S210). The image adjuster 25 performs the determination processing of the step S210 based on the vehicle information acquired by the information input section 24. In a case where the image adjuster 25 determines that the own vehicle speed exceeds the threshold (step S210: YES), the processing proceeds to step S260. On the other hand, in a case where the image adjuster 25 determines that the own vehicle speed is equal to or less than the threshold (step S210: NO), the processing proceeds to step S220. The threshold used in the determination processing of the step S210 means a preset reference speed for assuming whether or not the drive load on the driver is high. Thus, in a case where the own vehicle speed exceeds the threshold (e.g., 50 km per hour), it is assumed that the drive load is high. On the other hand, in a case where the own vehicle speed is equal to or less than the threshold, it is assumed that the drive load is low.

In a case where the processing proceeds to the step S260, the image adjuster 25 does not adjust the opacity of the vehicle image (turns off an opacity adjustment function). That is, the image adjuster 25 holds the setting of the opacity of the vehicle image at the maximum value. Thus, the driving assistance image output by the image output section 26 is, at the portion superimposed on the vehicle image, the image (the image in which the vehicle image is non-transparent) in which no target image as the lower-level layer is not visible. As described above, in a case where the drive load on the driver is high, the image adjuster 25 allows the driver to easily recognize the own vehicle on the surround-view image.

In a case where the processing proceeds to the step S220, the image adjuster 25 determines whether or not the target object is present on the target image at the portion superimposed on the vehicle image. The image adjuster 25 performs the determination processing of the step S220 based on the surrounding images acquired by the image input section 21 and the surround-view image (the target image) generated by the viewpoint converter 22. For example, a well-known pattern matching technique is used for the determination processing of the step S220. In a case where the image adjuster 25 determines that the target object is present (step S220: YES), the processing proceeds to step S230. On the other hand, in a case where the image adjuster 25 determines that no target object is present (step S220: NO), the processing proceeds to the step S260.

In a case where the processing proceeds to the step S230, the image adjuster 25 sets the opacity of the vehicle image to a lower value than that in a case where no target object is present (turns on the opacity adjustment function, and sets the adjustment value to a smaller value). Thus, the driving assistance image output by the image output section 26 is, at the portion superimposed on the vehicle image, the image (the image in which the degree of transparency of the vehicle image is high) in which the target image as the lower-level layer is more visible. As described above, in a case where the target object such as other vehicles, pedestrians, or obstacles is present around the vehicle, the image adjuster 25 allows the driver to easily recognize the target object on the surround-view image. Thereafter, the image adjuster 25 proceeds to step S240.

In a case where the processing proceeds to the step S260, the image adjuster 25 sets the opacity of the vehicle image to a higher value than that in a case where the target object is present (turns off the opacity adjustment function). Thus, the driving assistance image output by the image output section 26 is, at the portion superimposed on the vehicle image, the image (the image in which the degree of transparency of the vehicle image is low) in which the target image as the lower-level layer is less visible. As described above, in a case where no target object such as other vehicles, pedestrians, or obstacles is present around the vehicle, the image adjuster 25 allows the driver to easily recognize the own vehicle on the surround-view image.

The image adjuster 25 determines whether or not the distance between the target object and the own vehicle falls below a threshold (step S240). The image adjuster 25 performs the determination processing of the step S240 based on the vehicle information (the target information) acquired by the information input section 24. In a case where the image adjuster 25 determines that the distance falls below the threshold (step S240: YES), the processing proceeds to step S250. On the other hand, in a case where the image adjuster 25 determines that the distance is equal to or greater than the threshold (step S240: NO), the processing proceeds to the step S260. The threshold used in the determination processing of the step S240 means a preset reference distance for assuming whether or not the necessity of the driver recognizing the target object is high. Thus, in a case where the distance falls below the threshold, it is assumed that the necessity is high. On the other hand, in a case where the distance is equal to or greater than the threshold, it is assumed that the necessity is low. Note that the reference distance can be variably set according to the own vehicle speed.

In a case where the processing proceeds to the step S250, the image adjuster 25 sets the opacity of the vehicle image to a lower value than that in a case where the distance is equal to or greater than the threshold (turns on the opacity adjustment function, and sets the adjustment value to a smaller value). Thus, the driving assistance image output by the image output section 26 is, at the portion superimposed on the vehicle image, the image (the image in which the degree of transparency of the vehicle image is high) in which the target image as the lower-level layer is more visible. As described above, in a case where the target object such as other vehicles, pedestrians, or obstacles is present around the vehicle and the distance between the target object and the own vehicle is shorter than a predetermined distance, the image adjuster 25 allows the driver to easily recognize the target object on the surround-view image. Note that in a case where the distance between the target object and the own vehicle falls below a second threshold, the image adjuster 25 may set the opacity of the vehicle image to zero. The second threshold means a preset second reference distance for assuming whether or not the necessity of the driver recognizing the target object is high. A smaller value (a shorter distance) than the threshold used in the determination processing of the step S240 is set as the second threshold.

On the other hand, in a case where the processing proceeds to the step S260, the image adjuster 25 sets the opacity of the vehicle image to a higher value than that in a case where the target object is present (turns off the opacity adjustment function). Thus, the driving assistance image output by the image output section 26 is, at the portion superimposed on the vehicle image, the image (the image in which the degree of transparency of the vehicle image is low) in which the target image as the lower-level layer is less visible. Thereafter, the processing proceeds to the step S170 by the image output section 26 in the display control unit 20.

1-4. Advantageous Effects

In the driving assistance device 1 according to the present embodiment described above in detail, the following advantageous effects are provided.

(1a) The driving assistance device 1 variably sets the opacity of the vehicle image according to at least one of the vehicle surrounding condition or the vehicle running condition. Thus, in the driving assistance device 1, the vehicle image is, with the opacity varying according to situation, superimposed and displayed at the portion superimposed on the target image. Moreover, according to circumstances, the opacity may be set to zero so that the vehicle image can be brought into a hidden state at the portion superimposed on the target image. As described above, the driving assistance device 1 variably controls the form of displaying the vehicle image. With this configuration, the driving assistance image can be properly displayed for the driver in the driving assistance device 1 (the driving assistance image more useful to the driver can be displayed).

(2a) In a case where it is assumed that the drive load on the driver is high, the probability of the driver viewing the driving assistance image is low. Thus, the driving assistance device 1 variably sets the opacity of the vehicle image according to the own vehicle speed influencing the drive load condition. Specifically, the driving assistance device 1 sets the opacity of the vehicle image to a higher value in a case where the own vehicle speed is higher than a predetermined speed, thereby allowing the driver to easily recognize the own vehicle. With this configuration, the driving assistance device 1 allows the driver to focus on the drive operation. Specifically, in the driving assistance device 1, the opacity of the vehicle image is set to the maximum so that adjustment of the opacity can be omitted. As a result, unnecessary processing is eliminated.

(3a) The driving assistance device 1 variably sets the opacity of the vehicle image according to the presence/absence of the target object around the own vehicle. Specifically, the driving assistance device 1 sets the opacity of the vehicle image to a lower value in a case where the target object is preset around the own vehicle than in a case where no target object is present. With this configuration, the driving assistance device 1 allows the driver to easily recognize the target object.

(4a) The driving assistance device 1 variably sets the opacity of the vehicle image according to the distance between the target object and the own vehicle. Specifically, in a case where the distance between the target object and the own vehicle is equal to or greater than the predetermined distance, the driving assistance device 1 sets the opacity of the vehicle image to a higher value. With this configuration, in the driving assistance image, the driving assistance device 1 allows the driver to easily recognize a position relationship between the own vehicle and the target object present around the own vehicle. On the other hand, in a case where the distance between the target object and the own vehicle reaches shorter than the predetermined distance, the driving assistance device 1 sets the opacity to a lower value. With this configuration, the driving assistance device 1 allows the driver to easily recognize the target object such as a pedestrian positioned near the own vehicle.

(5a) The driving assistance device 1 adjusts the opacity for the portion of the vehicle image overlapping with the image region of the target image, but does not adjust the opacity for the portion of the vehicle image overlapping with the non-image region of the target image. With this configuration, the driving assistance device 1 can suitably realize both of easy recognition of the target object by the driver and easy recognition of the position relationship between the own vehicle and the target object present around the own vehicle by the driver.

[2. Other Embodiments]

In the above-described embodiment, the mode for carrying out the driving assistance device 1 and the driving assistance method using this device according to one aspect of the technique of the present disclosure has been described. However, the technique of the present disclosure is not limited to the above-described embodiment. The technique of the present disclosure can be implemented as the following various modifications.

(2A) In the above-described embodiment, in a case where the own vehicle speed is equal to or greater than the threshold in the opacity adjustment processing, the presence/absence of the target object around the own vehicle is determined, but the present disclosure is not limited to this configuration. In a case where the own vehicle speed is equal to or less than the threshold, the opacity of the vehicle image may be, regardless of the presence/absence of the target object, set lower than that in a case where the own vehicle speed exceeds the threshold, for example.

(2B) Multiple functions of a single component may be implemented by multiple components. A single function of a single component may be implemented by multiple components. Alternatively, multiple functions of multiple components may be implemented by a single component. A single function implemented by multiple components may be implemented by a single component. Moreover, the configuration of the above-described embodiment may be partially omitted. Moreover, at least part of the configuration of the above-described embodiment may be added to or replaced with other configurations of the above-described embodiment. Note that the embodiment of the technique of the present disclosure includes any aspect based on a technical idea specified only by phrasing in the claims.

(2C) The technique of the present disclosure can be provided not only in the form of the above-described driving assistance device 1 and driving assistance method, but also in the following form. Specifically, the form includes, for example, a system including the driving assistance device 1 as a component, one or more programs for causing a computer to function as the driving assistance device 1, and one or more recording media recording at least some of the programs.

REFERENCE SIGNS LIST

1 . . . Driving assistance device
10 . . . In-vehicle camera
12 . . . CPU
14 . . . Memory
20 . . . Display control unit
21 . . . Image input section
22 . . . Viewpoint converter
23 . . . Image combining section
24 . . . Information input section
25 . . . Image adjuster
26 . . . Image output section
30 . . . Display

The invention claimed is:

1. A driving assistance device comprising:
a converter configured to convert an image captured by a vehicle imaging device mounted to and configured to image a periphery of a vehicle into an image viewed from a preset virtual viewpoint;
a combining section configured to use, as a target image, the image converted from the captured image by the converter, thereby combining, as a higher-level layer, a vehicle image indicating position and shape of the vehicle combined with the target image;
an adjuster configured to variably set an opacity of the vehicle image according to at least one of a vehicle surrounding condition or a vehicle running condition when the opacity of the vehicle image is adjusted such that the target image as a lower-level layer is visible at a superimposed portion where the target image is superimposed the vehicle image combined by the combining section; and
an output section configured to output, as a driving assistance image, the target image combined with the vehicle image using the combining section;
wherein:
the converter converts each image captured by multiple vehicle imaging devices into an image viewed from the virtual viewpoint, thereby generating, as the target image, an image obtained by joining of part of each converted image;
the target image has an image region where the converted image is present, and a non-image region where no converted image is present, the image region is a region which can be captured by the vehicle imaging device, the non-image region is a region which cannot be captured by the vehicle imaging device; and
the adjuster adjusts the opacity for a portion of the vehicle image overlapping with the image region, but does not adjust the opacity for a portion of the vehicle image overlapping with the non-image region.

2. The driving assistance device according to claim 1, wherein
the adjuster sets the opacity of the vehicle image to a high value according to a speed of the vehicle.

3. The driving assistance device according to claim 1, wherein
the adjuster sets the opacity of the vehicle image to a lower value in a case where a target object is present around the vehicle than in a case where no target object is present.

4. The driving assistance device according to claim 3, wherein
the adjuster sets the opacity of the vehicle image to a high value according to a distance between the target object and the vehicle.

5. A driving assistance method in a driving assistance device, comprising:
a conversion step of converting an image captured by a vehicle imaging device mounted to and configured to image a periphery of a vehicle into an image viewed from a preset virtual viewpoint;
a combining step of using, as a target image, the image converted from the captured image by the conversion step, thereby combining, as a higher-level layer, a vehicle image indicating position and shape of the vehicle combined with the target image;
an adjustment step of variably setting an opacity of the vehicle image according to at least one of a vehicle surrounding condition or a vehicle running condition when the opacity of the vehicle image is adjusted such that the target image as a lower-level layer is visible at a superimposed portion where the target image is superimposed the vehicle image combined by the combining step; and
an outputting step of outputting, as a driving assistance image, the target image combined with the vehicle image by the combining step;
wherein:
the converting step comprises converting each image captured by multiple vehicle imaging devices into an image viewed from the virtual viewpoint, thereby generating, as the target image, an image obtained by joining of part of each converted image;
the target image has an image region where the converted image is present, and a non-image region where no converted image is present, the image region is a region which can be captured by the vehicle imaging device, the non-image region is a region which cannot be captured by the vehicle imaging device; and
the adjustment step comprises adjusting the opacity for a portion of the vehicle image overlapping with the image region, but does not adjust the opacity for a portion of the vehicle image overlapping with the non-image region.

* * * * *